Oct. 10, 1944.   R. L. HAYMAN   2,359,846
ADJUSTABLE BULKHEAD COUPLING
Filed June 8, 1942
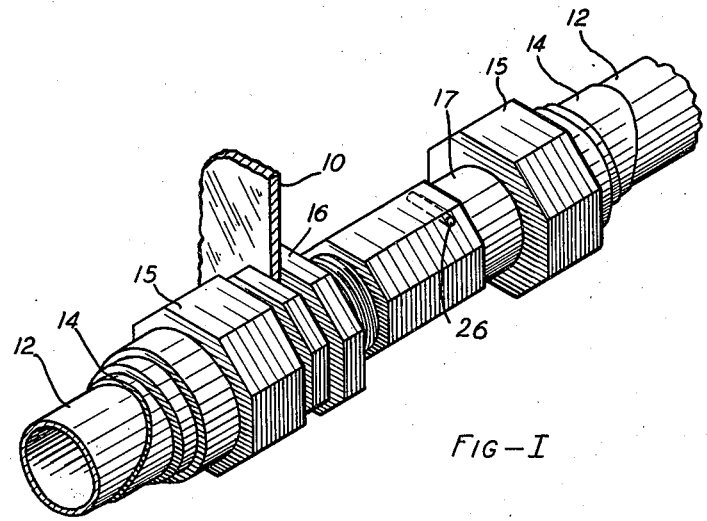
Fig-I
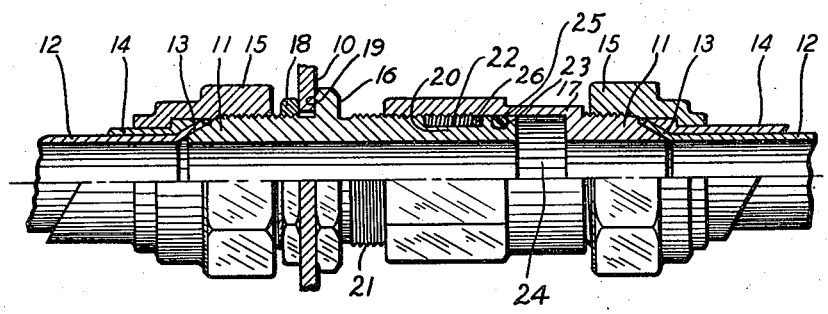
Fig-II
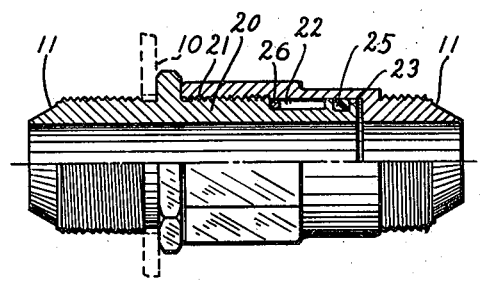
Fig-III
INVENTOR
RICHARD L. HAYMAN
BY George C. Sullivan Patented Oct. 10, 1944

2,359,846

UNITED STATES PATENT OFFICE 2,359,846

ADJUSTABLE BULKHEAD COUPLING

Richard L. Hayman, North Hollywood, Calif., assignor to Lockheed Aircraft Corporation, Burbank, Calif.

Application June 8, 1942, Serial No. 446,189

6 Claims. (Cl. 285—25)

This invention relates to an improved adjustable tube coupling for connecting fluid lines through bulkheads, such, for example, as the firewall commonly used between an engine and the balance of an aircraft structure.

Due to the complexity and multiplicity of fittings, such as the control, supply, return, and gage lines, the space available at and adjacent to such a bulkhead or firewall is at a premium, and it is difficult to connect and disconnect a unit in a maze of piping which may have to be bent in several directions and planes to clear structures and equipment adjacent thereto. At best, such plumbing installations are uncertain even in interchangeable production where the piping is cut and bent to shape with the aid of jigs and fixtures; because of the normal growth and warp attendant upon the assembly of a sheet metal structure such as an airplane. Thus precut and preformed piping may be found to run over or under the exact mating dimensions, and in precision work such as in aircraft it is not permissible to stretch a short or compress an over-length piece of tubing; while the flared ends provided for the usual type of coupling prevent subsequent trimming to length if oversize.

Accordingly, it is an object of this invention to provide an improved bulkhead coupling which is adjustable in length, on at least one side of the bulkhead or firewall, to compensate for such variations in the length requirements of the tubing, in order to avoid loss of time and material in trial assemblies in hard to get at locations, thus permitting complete preliminary forming and bending of the plumbing lines to facilitate a production set up.

It is also an object of this invention to provide a coupling for mounting in bulkheads or the like that can be adjusted in length in situ to receive preformed tubing ends, the adjustment being limited to a predetermined amount and sealed by a packing ring unaffected by such movement and not requiring loosening prior to, or tightening after, such adjustment to the tubing length.

Other and further important objects of this invention will be apparent from the disclosures in the specification and the accompanying drawing.

This invention, in its preferred forms, is illustrated in the drawing and hereinafter more fully described.

In the drawing—

Fig. I is a perspective drawing of a bulkhead coupling embodying the features of this invention, as assembled through a bulkhead with tube couplings in place thereon.

Fig. II is a plan view partly in section, corresponding to Fig. I, the coupling being shown in its fully extended position.

Fig. III is a view of the coupling alone, partly in section and shown in its retracted position.

As shown in the drawing—

The invention is directed to an adjustable coupling to be mounted in and extend through a bulkhead or firewall which has been indicated as a sheet of metal 10, the bulkhead coupling of this invention terminating in threaded and flared male ends 11 intended to receive conventional tube couplings. As shown, tubes 12 have flared ends 13 seating on the male ends 11 and surrounded by a shouldered sleeve 14 engaged by a compression nut 15 in the usual manner. The specific example chosen for illustrative purposes represents conventional aircraft practice, where such joints are subject to severe service, and reliability is essential. For other and less severe requirements the sleeve 14 is usually omitted and the nut 15 seats directly on the flared end 13 of the tube 12. In any case the type of coupling is immaterial to the present invention, which relates to the adjustable length bulkhead fitting which permits such fitting to be adjusted to engage the preformed end of the tube 12 without distortion of the tubing or a trial and error system of selecting or cutting the tube to exact length.

The bulkhead coupling of this invention comprises a passaged two-part body 16 and 17 terminating at the opposite ends in the male members 11 of conventional tube couplings, as described above. The left hand part 16 is arranged to be mounted in the bulkhead 10 by means of a nut 18 clamping the bulkhead material against a shoulder 19, the nut 18 using the threads provided for the tube coupling nut 15. To the right of the bulkhead location the member 16 has an extension 20 threaded at 21 and grooved or channeled at 22 and 23, the shoulders defining the groove near the outer end of the member 16 being a free sliding fit in a counterbored recess 24 in the second member 17, this recess having its mouth internally threaded to engage the threads 21 on the extension 20. The narrow groove 23 is intended to receive a rubber-like annular ring 25 which normally fits loosely between the shoulders and stands above the surface thereof, being compressed into the groove 23, into sealing contact between the extension 20 and the counterbored recess 24, where these parts are in assembled relationship. The wide channel or groove 22, between the groove 23 and the threads 21, is provided to give clearance to a stop pin 26 which limits the motion of the member 17 on the extension 20 to the width of the groove 22, without preventing rotation of the member 17 between these limits.

In the use of the adjustable coupling of this invention the parts 16 and 17 are pre-assembled by screwing the extension 20 into the recess 24, preferably to the midpoint of its adjustment range, and the stop pin 26 inserted to prevent dissembly after the coupling has been mounted in the bulkhead. The member 17 is then screwed out or in on the extension 20 to accommodate the male end 11 of the conventional tube coupling to the flared end 13 of the tube 12 to be connected thereto, such adjustment of the bulkhead coupling member 17 eliminating the need of trial and error methods heretofore necessary for the installation of tubing, especially in the cramped quarters available in aircraft.

While I have chosen to illustrate and describe the tube connector of this invention as mounted in a bulkhead or firewall, it will be evident that it is equally advantageous to use the novel principles of this invention in other locations including the direct coupling of two lengths of tubing or the attachment of tubing to gages, pumps and the like.

Having thus described my invention and the present preferred embodiments thereof, I desire to emphasize the fact that many modifications may be resorted to in a manner limited only by a just interpretation of the following claims.

I claim:

1. An adjustable tube coupling connector for mounting in bulkheads and the like, comprising two members, each forming part of a conventional tube coupling and arranged for threaded engagement with each other, one of said members having a circumferentially grooved extension slideable within a counterbore in the other of said members, an annular rubber-like packing ring carried by one groove in said extension and sealingly engaging in said counterbore and a stop pin engaging in another groove in said extension, said other groove being of a width sufficient to permit limited sidewise movement of the pin therein whereby to limit the telescoping movement of said members.

2. An adjustable tube coupling for mounting in a bulkhead or the like to receive tube couplings on either side of said bulkhead, comprising a male member for mounting in an aperture in said bulkhead, said male member having a conventional tubing coupling connection on one side of the bulkhead and a circumferentially grooved cylindrical extension on the other side of said bulkhead, a second member having a smooth walled cylindrical surface therein telescopingly engaging over the extension on said first member, said second member also providing a conventional tubing coupling connection, and an annular sealing ring of deformable material positioned in the groove on said extension and arranged to sealingly and slidingly engage the wall of the cylindrical surface in said second member whereby to seal said connection at any point of adjustment thereof.

3. An adjustable tube coupling for mounting in a bulkhead or the like to receive tube couplings on either side of said bulkhead, comprising a male member for mounting in an aperture in said bulkhead, said male member having a conventional tubing coupling connection on one side of the bulkhead and a circumferentially grooved cylindrical extension on the other side of said bulkhead, a second member having a smooth cylindrical surface therein telescopingly engaging over the extension on said first member for longitudinal adjustment relative thereto, said second member also providing a conventional tubing coupling connection, an annular sealing ring of deformable material positioned in the groove on said extension and arranged to sealingly engage the cylindrical surface in said second member whereby to seal said connection at any point of adjustment thereof, and means limiting the range of longitudinal adjustment of said members.

4. An adjustable tube coupling for mounting in a bulkhead or the like to receive tube couplings on either side of said bulkhead, comprising a male member for mounting in an aperture in said bulkhead, said male member having a conventional tubing coupling connection on one side of the bulkhead and a cylindrical extension on the other side of said bulkhead, a second member having a recess therein telescopingly engaging over the extension on said first member for longitudinal adjustment relative thereto, said second member also providing a conventional tubing coupling connection, and means limiting the range of longitudinal adjustment of said members.

5. An adjustable tube coupling connector for mounting in bulkheads and the like, comprising two members, each forming part of a conventional tube coupling and arranged for threaded engagement with each other, one of said members having a circumferentially grooved extension slideable within a counterbore in the other of said members, and a stop pin engaging in the groove in said extension, said groove being of sufficient width to permit a predetermined range of movement of the stop pin therein whereby to limit the telescoping movement of said members.

6. An adjustable tube coupling connector comprising two members, at least one of which forms part of a conventional tube coupling and arranged for threaded engagement with each other, one of said members having a circumferentially grooved extension slideable within a counterbore in the other of said members, and a transversely disposed stop pin engaging in the groove in said extension, said groove being of sufficient width to permit a predetermined sidewise movement of the stop pin therein whereby to limit the telescoping movement of said members.

RICHARD L. HAYMAN.